(12) United States Patent
Zhang et al.

(10) Patent No.: US 8,873,251 B2
(45) Date of Patent: Oct. 28, 2014

(54) OUTPUT ADJUSTMENT CIRCUIT FOR POWER SUPPLY UNIT

(75) Inventors: Yun-Fei Zhang, Wuhan (CN); Yu-Lin Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/552,747

(22) Filed: Jul. 19, 2012

(65) Prior Publication Data

US 2013/0135909 A1 May 30, 2013

(30) Foreign Application Priority Data

Nov. 29, 2011 (CN) .......................... 2011 1 0386734

(51) Int. Cl.
*H02M 3/335* (2006.01)

(52) U.S. Cl.
USPC ........................................ 363/21.01; 363/147

(58) Field of Classification Search
USPC ............... 363/20, 21.04, 21.07, 21.08, 21.12, 363/21.18; 324/537, 750.01, 763.01, 324/763.02, 555

See application file for complete search history.

(56) References Cited

U.S. PATENT DOCUMENTS

| | | | |
|---|---|---|---|
| 4,694,240 A * | 9/1987 | Grunsch | 323/285 |
| 5,029,267 A * | 7/1991 | Masuda et al. | 331/107 A |
| 5,313,381 A * | 5/1994 | Balakrishnan | 363/147 |
| 8,294,371 B2 * | 10/2012 | Ghanem et al. | 315/119 |
| 8,331,117 B2 * | 12/2012 | Shih et al. | 363/65 |
| 8,339,810 B2 * | 12/2012 | Ratnaparkhi et al. | 363/21.01 |
| 2009/0097291 A1 * | 4/2009 | Bormann | 363/126 |

FOREIGN PATENT DOCUMENTS

TW 200743284 A 11/2007

* cited by examiner

*Primary Examiner* — Rajnikant Patel
(74) *Attorney, Agent, or Firm* — Novak Druce Connolly Bove + Quigg LLP

(57) ABSTRACT

An output adjustment circuit includes a rectifier and filter circuit, a voltage drop circuit, a voltage output circuit, a PWM regulator, and a feedback circuit. The rectifier and filter circuit receives an AC voltage and converts it into a square wave signal. The voltage drop circuit includes a primary coil and a secondary coil. The primary coil is connected to the rectifier and filter circuit. The primary coil receives the square wave signal. The voltage output circuit is connected to the secondary coil. The PWM regulator is connected to the primary coil. The PWM regulator generates a pulse signal to turn on and turn off the primary coil periodically. The feedback circuit controls a duty cycle of the pulse signal to adjust a during time of the primary coil being on in a cycle. The primary coil transmits energy to the secondary coil according the during time.

12 Claims, 2 Drawing Sheets

OUTPUT ADJUSTMENT CIRCUIT FOR POWER SUPPLY UNIT

BACKGROUND

1. Technical Field

The present disclosure relates to power supply units, and more particularly to an output adjustment circuit for power supply unit.

2. Description of Related Art

A computer is often equipped with a power supply unit, which converts an alternating current (AC) voltage to direct current (DC) voltages. These converted DC voltages are provided to different electronic elements of the computer. However, because the AC voltage is often not stable, the converted DC voltages often varies, which causes the electronic elements to work abnormally.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
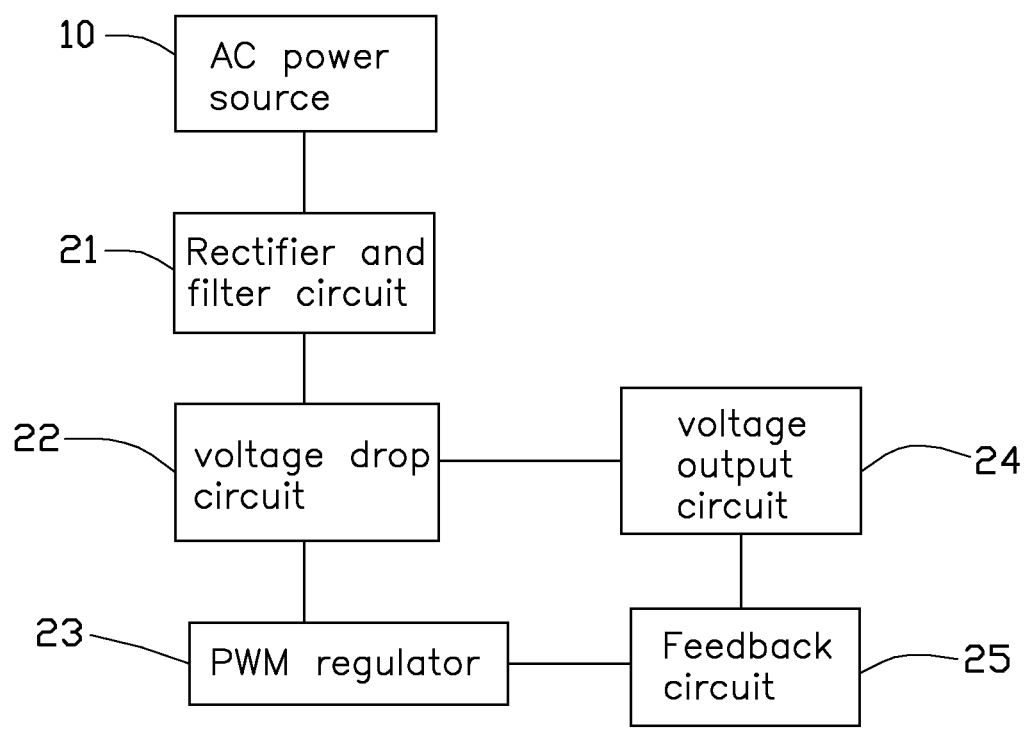
FIG. 1 is a block diagram view of an embodiment of an output adjustment circuit for a power supply unit.

FIG. 1 shows an embodiment of an output adjustment circuit for a power supply unit. The output adjustment circuit includes a rectifier and filter circuit 21, a voltage drop circuit 22, a pulse-width modulation (PWM) regulator 23, a voltage output circuit 24, and a feedback circuit 25.

The rectifier and filter circuit 21 is connected to an AC power source 10 to receive an AC voltage. The rectifier and filter circuit 21 converts the AC voltage into a square wave signal which is symmetrical about zero volts or above zero volts. The voltage drop circuit 22 receives the square wave signal. The voltage drop circuit 22 is connected to the PWM regulator 23. The voltage drop circuit 22 lowers the voltage of the square wave signal according to a pulse signal provided by the PWM regulator 23. The voltage output circuit 24 is connected to the voltage drop circuit 22 and outputs the dropped voltage. The feedback circuit 25 is connected to the voltage output circuit 24 and the PWM regulator 23. The feedback circuit 25 monitors the dropped voltage being output by the voltage output circuit 24 and controls the duty cycle of the pulse signal of the PWM regulator 23.

Figure 2:
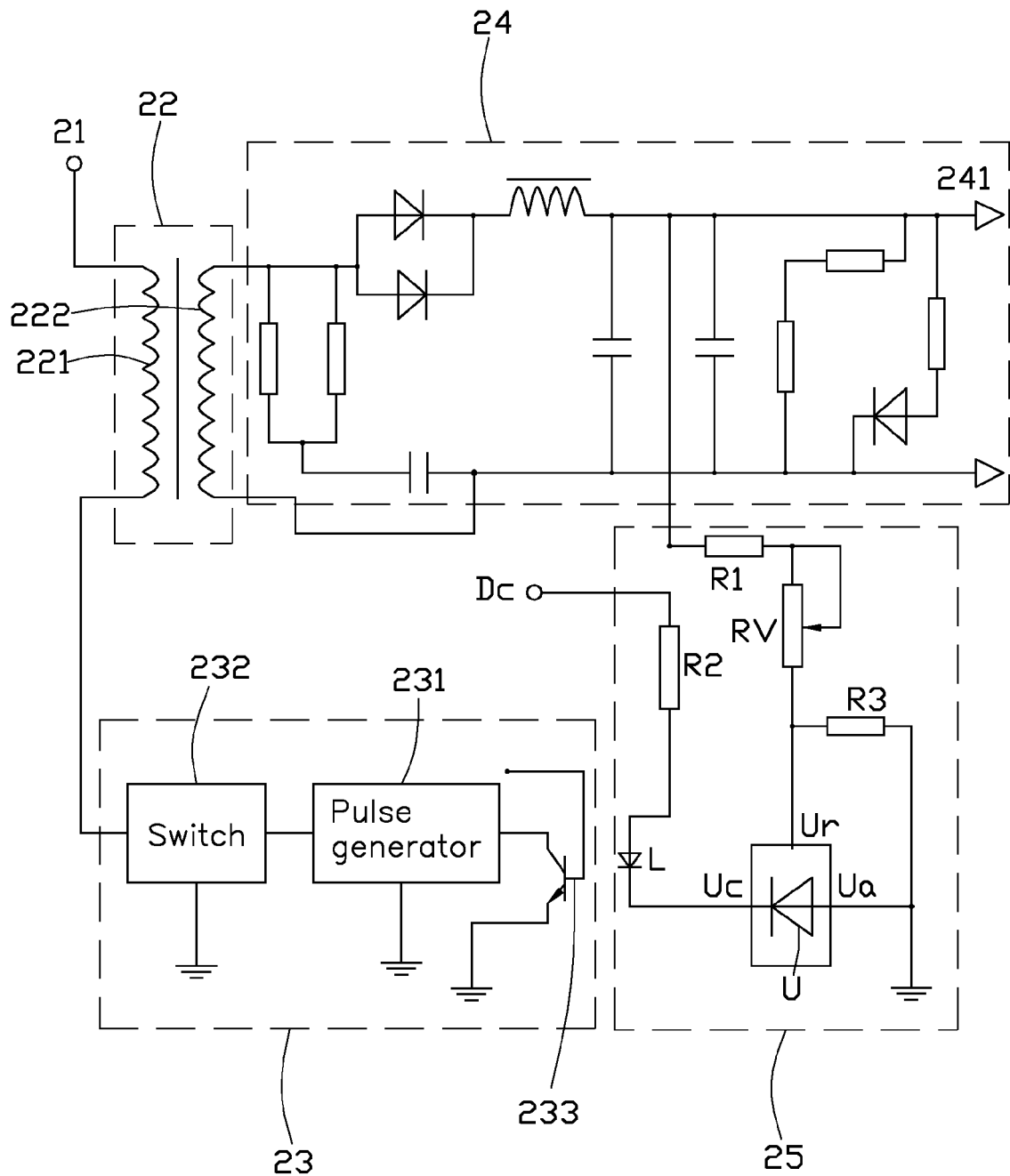
FIG. 2 is a schematic view of the output adjustment circuit of FIG. 1.

FIG. 2, illustrates the voltage drop circuit 22 of one embodiment. The voltage drop circuit 22 includes a primary coil 221 and a secondary coil 222. A first end of the primary coil 221 is connected to the rectifier and filter circuit 21. A second end of the primary coil 221 is connected to the PWM regulator 23. The secondary coil 222 is connected to the voltage output circuit 24. The voltage output circuit 24 includes an output end 241 which outputs a DC voltage to a computer.

The feedback circuit 25 includes a first resistor R1, a second resistor R2, a third resistor R3, a light-emitting diode L, a variable resistor RV, and a three-terminal adjustable regulator U. The three-terminal adjustable regulator U includes a regulator anode Ua, a regulator cathode Uc, and a reference end Ur. When the voltage value on the reference end Ur is close to a reference voltage, an unsaturated current flows through the regulator anode Ua and the regulator cathode Uc. The value of the unsaturated current increases with an increase of the voltage value on the reference end Ur. The value of the unsaturated current decreases with a decrease of the voltage value on the reference end Ur.

The adjustable terminal of the variable resistor RV is connected to the output end 241 of the voltage output circuit 24 via the first resistor R1. The fixed terminal of the variable resistor RV is connected to ground via the third resistor R3. The light-emitting diode L includes a diode anode and a diode cathode. The diode anode is connected to a stable direct voltage source Dc. The diode cathode is connected to the regulator cathode Uc. The reference end Ur is connected to the fixed terminal of the variable resistor RV. The regulator anode Ua is connected to ground.

The PWM regulator 23 includes a pulse generator 231, a switch 232, and an opto-electronic coupler 233. The opto-electronic coupler 233 is located adjacent to the light-emitting diode L and senses light emitted by the light-emitting diode L. The opto-electronic coupler 233 includes a first coupler end and a second coupler end. The first coupler end is connected to ground. The second coupler end is connected to the pulse generator 231. The primary coil 221 is connected to ground via the switch 232. The pulse generator 231 is connected to the switch 232 and turns the switch 232 on and off at a certain frequency. When the light-emitting diode L is brightly illuminated, the current flowing through the opto-electronic coupler 233 is large. So, the duty cycle of the pulse generated by the pulse generator 231 is small, that is, the "on" time of the switch is small. The voltage drop circuit 22 works a short during time in a cycle. Therefore, the secondary coil 222 receives a small amount of energy in one cycle, which causes only a small voltage to be output by the voltage output circuit 24. Vice versa, when the light-emitting diode L emits a weak light, the voltage output by the voltage output circuit 24 is large.

FIGS. 1 to 2, illustrates the output adjustment circuit is in operation. The AC power source 10 provides an AC voltage to the rectifier and filter circuit 21. The rectifier and filter circuit 21 converts the AC voltage into a square wave signal, which is sent to the primary coil 221. The secondary coil 222 generates a corresponding voltage. The output end 241 outputs a DC voltage to the computer.

If the DC voltage output of the output end 241 is high, the voltage on the reference end Ur increases. The amount of current flowing through the light-emitting diode L increases. The light being emitted by the light-emitting diode L becomes brighter. Therefore, the DC voltage output of the output end 241 decreases to adjust.

If the DC voltage output of the output end 241 is low, the voltage on the reference end Ur decreases. The amount of current flowing into the light-emitting diode L decreases, and the light emitted by the light-emitting diode L becomes weaker. As a result, the DC voltage output of the output end 241 increases to adjust.

In the above output adjustment circuit, the variable resistor RV also can vary to adjust the DC voltage output of the output end 241 to satisfy different needs.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. An output adjustment circuit, comprising:
   a rectifier and filter circuit configured to receive an alternative current (AC) voltage and convert the AC voltage into a square wave signal;
   a voltage drop circuit comprising a primary coil and a secondary coil, the primary coil connected to the rectifier and filter circuit, the primary coil configured to receive the square wave signal;
   a voltage output circuit connected to the secondary coil;
   a pulse-width modulation (PWM) regulator connected to the primary coil, and the PWM regulator configured to generate a pulse signal to turn on and turn off the primary coil periodically; and
   a feedback circuit connected to the PWM regulator, the feedback circuit configured to control a duty cycle of the pulse signal to adjust a during time of the primary coil being on in a cycle, and the primary coil configured to transmit corresponding energy to the secondary coil according the during time;
   wherein the feedback circuit comprises a light-emitting diode, the PWM regulator comprises an opto-electronic coupler and a pulse generator configured to generate the pulse signal, the opto-electronic coupler connected to the pulse generator, the opto-electronic coupler located adjacent to the light-emitting diode to sense light emitted by the light-emitting diode, and a first current flowing through the opto-electronic coupler being adjusted by the brightness of the light emitted by the light-emitting diode, and the duty cycle of the pulse signal being adjusted by the first current;
   wherein the feedback circuit comprises a three-terminal adjustable regulator comprising a regulator anode, a regulator cathode, and a reference end, the light-emitting diode comprises a diode anode and a diode cathode, the regulator cathode connected to the diode cathode, the regulator anode connected to ground, and a voltage value on the reference end being configured to adjust a second current flowing through the regulator anode and the regulator cathode.

2. The output adjustment circuit of claim 1, wherein the voltage output circuit comprises an output end which is configured to output an DC voltage, the reference end is connected to the output end via a variable resistor.

3. The output adjustment circuit of claim 2, wherein the variable resistor comprises an adjustable terminal and a fixed terminal, the fixed terminal is connected to the reference end, and the adjustable terminal is connected to the output end via a first resistor.

4. The output adjustment circuit of claim 3, wherein the reference end is connected to ground via a third resistor.

5. The output adjustment circuit of claim 1, wherein the diode anode is connected to a stable direct voltage source via a second resistor.

6. The output adjustment circuit of claim 1, wherein the PWM regulator comprises a switch, the primary coil is connected to ground via the switch, and the pulse signal is supplied to the switch to turn on and turn off the switch periodically.

7. An output adjustment circuit, comprising:
   a rectifier and filter circuit configured to receive an alternative current (AC) voltage and configured to convert the AC voltage into a square wave signal;
   a voltage drop circuit connected to the rectifier and filter circuit, and the voltage drop circuit configured to receive the square wave signal;
   a voltage output circuit connected to the voltage drop circuit;
   a pulse-width modulation (PWM) regulator connected to the voltage drop circuit, and the PWM regulator configured to generate a pulse signal to turn on and turn off the voltage drop circuit periodically; and
   a feedback circuit connected to the PWM regulator, and the feedback circuit configured to control a duty cycle of the pulse signal to adjust a during time of the voltage drop circuit being on in a cycle;
   wherein the voltage drop circuit comprises a primary coil and a secondary coil, the primary coil connected to the rectifier and filter circuit to receive the square wave signal, and the secondary coil connected to the voltage output circuit;
   wherein the feedback circuit comprises a light-emitting diode, the PWM regulator comprises an opto-electronic coupler and a pulse generator configured to generate the pulse signal, the opto-electronic coupler connected to the pulse generator, the opto-electronic coupler located adjacent to the light-emitting diode to sense light emitted by the light-emitting diode, a first current flowing through the opto-electronic coupler being adjusted by the brightness of the light emitted by the light-emitting diode, and the duty cycle of the pulse signal being adjusted by the first current;
   wherein the feedback circuit comprises a three-terminal adjustable regulator comprising a regulator anode, a regulator cathode, and a reference end, the light-emitting diode comprises a diode anode and a diode cathode, the regulator cathode connected to the diode cathode, the regulator anode connected to ground, and a voltage value on the reference end being configured to adjust a second current flowing through the regulator anode and the regulator cathode.

8. The output adjustment circuit of claim 7, wherein the voltage output circuit comprises an output end which is configured to output an DC voltage, the reference end is connected to the output end via a variable resistor.

9. The output adjustment circuit of claim 8, wherein the variable resistor comprises an adjustable terminal and a fixed terminal, the fixed terminal is connected to the reference end, the adjustable terminal is connected to the output end via a first resistor.

10. The output adjustment circuit of claim 9, wherein the reference end is connected to ground via a third resistor.

11. The output adjustment circuit of claim 7, wherein the diode anode is connected to a stable direct voltage source via a second resistor.

12. The output adjustment circuit of claim 7, wherein the PWM regulator comprises a switch, the primary coil is connected to ground via the switch, and the pulse signal is supplied to the switch to turn on and turn off the switch periodically.

* * * * *